(12) United States Patent
Mizui et al.

(10) Patent No.: US 8,814,136 B2
(45) Date of Patent: Aug. 26, 2014

(54) SOLENOID VALVE

(75) Inventors: Hiroyuki Mizui, Nagoya (JP);
Yoshitsugu Inaguma, Chita-gun (JP);
Motoyoshi Ando, Nagoya (JP)

(73) Assignee: Denso Corporation, Kariya (JP)

( * ) Notice: Subject to any disclaimer, the term of this patent is extended or adjusted under 35 U.S.C. 154(b) by 232 days.

(21) Appl. No.: 13/471,668

(22) Filed: May 15, 2012

(65) Prior Publication Data

US 2012/0292542 A1   Nov. 22, 2012

(30) Foreign Application Priority Data

May 16, 2011   (JP) .................... 2011-109732

(51) Int. Cl.
*F16K 31/02* (2006.01)
*F16K 31/06* (2006.01)

(52) U.S. Cl.
CPC ..................... *F16K 31/06* (2013.01)
USPC ..................... 251/129.15; 335/220

(58) Field of Classification Search
CPC ..... H01F 7/128; H01F 7/081; F16K 31/0613; F16K 31/061; F16K 11/07
USPC ..................... 251/129.15; 335/220
See application file for complete search history.

(56) References Cited

U.S. PATENT DOCUMENTS

| 4,261,545 | A  | * | 4/1981 | Allen .............................. 251/40 |
| 8,109,487 | B2 | * | 2/2012 | Kokubu et al. ............ 251/129.15 |
| 2006/0243938 | A1 |  | 11/2006 | Ishibashi et al. |
| 2007/0158606 | A1 | * | 7/2007 | Oishi ....................... 251/129.15 |
| 2008/0142752 | A1 | * | 6/2008 | Matzner ......................... 251/314 |
| 2009/0140192 | A1 | * | 6/2009 | Yamamoto et al. ...... 251/129.15 |
| 2012/0291900 | A1 | * | 11/2012 | Mizui ...................... 137/625.64 |

FOREIGN PATENT DOCUMENTS

| EP | 0 207 021 | 12/1986 |
| JP | 06-028450 | 4/1994 |
| JP | 2000-038739 | 2/2000 |
| JP | 2003-329164 | 11/2003 |
| JP | 2006-177491 | 7/2006 |
| JP | 2012-059479 | 3/2012 |

OTHER PUBLICATIONS

Office Action (2 pages) dated May 14, 2013, issued in corresponding Japanese Application No. 2011-109732 and English translation (3 pages).

* cited by examiner

*Primary Examiner* — Elizabeth Houston
*Assistant Examiner* — Ian Paquette
(74) *Attorney, Agent, or Firm* — Nixon & Vanderhye PC

(57) ABSTRACT

A solenoid valve includes a linear solenoid and a ring-shaped rubber packing. The solenoid includes a yoke, an outer connector, a volume changing chamber, and a breathing passage. The yoke is made of a magnetic material and formed in a generally cylindrical cup shape having a cup-bottom part and a cup-opening part. The cup-opening part includes a notch. The connector is made of resin and exposed from the notch to an outside of the yoke. Volume of the chamber is changed in accordance with operation of the solenoid. The passage is formed inside the solenoid, and communicates with the chamber. The passage includes an outer opening, which opens into the outside of the yoke and is located at a fitted part between the yoke and the connector. The packing is attached around a base of the connector, where the yoke and the connector are fitted together.

5 Claims, 6 Drawing Sheets

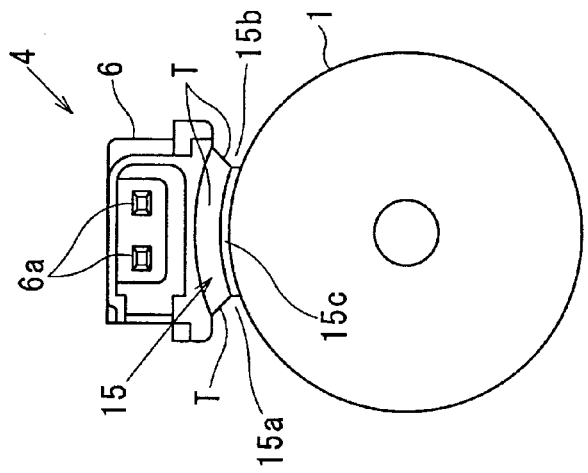
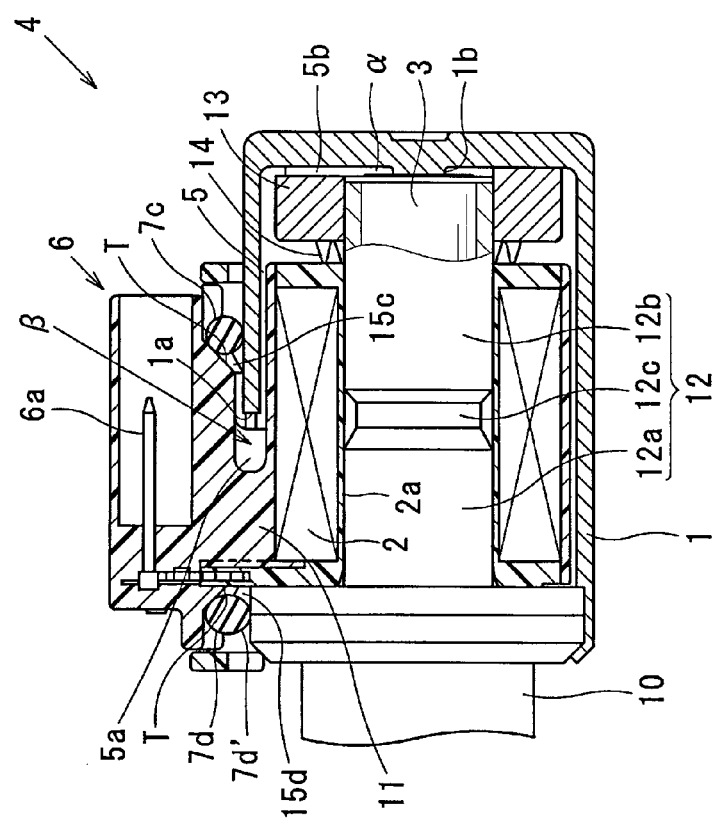
FIG. 2A
FIG. 2B

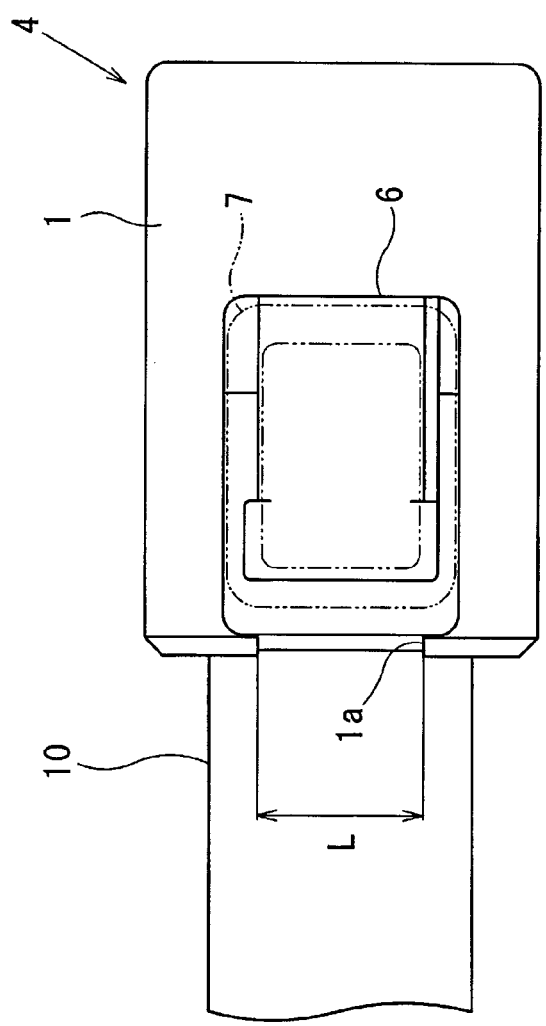

US 8,814,136 B2

SOLENOID VALVE

CROSS REFERENCE TO RELATED APPLICATION

This application is based on Japanese Patent Application No. 2011-109732 filed on May 16, 2011, the disclosure of which is incorporated herein by reference.

TECHNICAL FIELD

The present disclosure relates to a solenoid valve (electromagnetic valve) including a linear solenoid (electromagnetic actuator) in which an outer opening of a breathing passage is located at a fitted part between an outer connector and a yoke (bottom part of the outer connector). The present disclosure relates to, for example, the solenoid valve suitable for use in a hydraulic control system of an automatic transmission for a vehicle.

BACKGROUND

Background arts will be described in reference to FIGS. 5 to 6B. As illustrated in FIGS. 5 to 6B, a solenoid valve obtained by coupling together a linear solenoid 104 in which an outer opening 105a of a breathing passage 105 is located in a fitted part β' between an outer connector 106 and a yoke 101; and a valve V' (a spool valve in FIG. 5) driven by this linear solenoid 104, is known (see, for example, Japanese Patent No. 4569371 corresponding to US2006/0243938A1, and JP-A-2003-329164). In addition, Japanese Patent No. 4569371 describes the solenoid valve that uses a ring core 108 (magnetic material ring for delivering and receiving magnetism between a sliding core 112b and a cup bottom part of the yoke 101), and JP-A-2003-329164 describes the solenoid valve without using the ring core 108.

As described above, in the solenoid valve in which the outer opening 105a of the breathing passage 105 is located at a bottom part of the outer connector 106, when the outer connector 106 is disposed toward an upper portion of the yoke 101 (upper side in the vertical direction), the outer opening 105a opens on the upper side of the yoke 101. For this reason, a foreign substance falling from above (such as the case of an oil droplet falling from a mechanical part of an automatic transmission as illustrated on a right-hand side in FIG. 6B), or a foreign substance slowly falling in oil (such as the case of the valve being disposed in oil inside an oil pan as illustrated on a left-hand side in FIG. 6B) can easily enter into the breathing passage 105 through the outer opening 105a.

The breathing passage 105 described in Japanese Patent No. 4569371 and JP-A-2003-329164 communicates between the fitted part β' between the outer connector 106 and the yoke 101 (bottom part of the outer connector 106), and a volume changing chamber α' formed between a plunger 103 and the bottom part of the yoke 101 by the shortest distance as illustrated in FIGS. 6A and 6B. Accordingly, when the outer connector 106 is arranged on the upper side, the foreign substance, which has entered into the breathing passage 105 through the outer opening 105a, easily reaches the volume changing chamber α' (sliding part of the plunger 103). As a result, there is concern that a defect in sliding of the plunger 103 may be caused due to the foreign substance which has reached the volume changing chamber α'. Therefore, in the solenoid valve by the conventional technology, there has been concern that malfunctions may be caused as a result of entering of the foreign substance in the case of the outer connector 106 being disposed upward.

SUMMARY

According to the present disclosure, there is provided a solenoid valve including a linear solenoid and a ring-shaped rubber packing. The linear solenoid includes a yoke, an outer connector, a volume changing chamber, and a breathing passage. The yoke is formed in a generally cylindrical cup shape having a cup-bottom part and a cup-opening part, and the yoke is made of a magnetic material. The cup-opening part includes a notch part. The outer connector is made of resin and exposed from the notch part to an outside of the yoke. Volume of the volume changing chamber is changed in accordance with operation of the linear solenoid. The breathing passage is formed inside the linear solenoid, and the breathing passage communicates with the volume changing chamber. The breathing passage includes an outer opening, which opens into the outside of the yoke and is located at a fitted part between the yoke and the outer connector. The ring-shaped rubber packing is attached around a base part of the outer connector, where the yoke and the outer connector are fitted together.

BRIEF DESCRIPTION OF THE DRAWINGS

The above and other objects, features and advantages of the present disclosure will become more apparent from the following detailed description made with reference to the accompanying drawings. In the drawings:

FIG. 2A is a sectional view illustrating a main feature of a linear solenoid in the solenoid valve to which the rubber packing is attached according to the first embodiment;

FIG. 2B is a diagram illustrating a solenoid valve, to which a rubber packing is not attached, when the solenoid valve is viewed from a cup bottom in accordance with the first embodiment;

FIG. 3 is a top view illustrating the linear solenoid of the first embodiment;

DETAILED DESCRIPTION

Figure 1A:
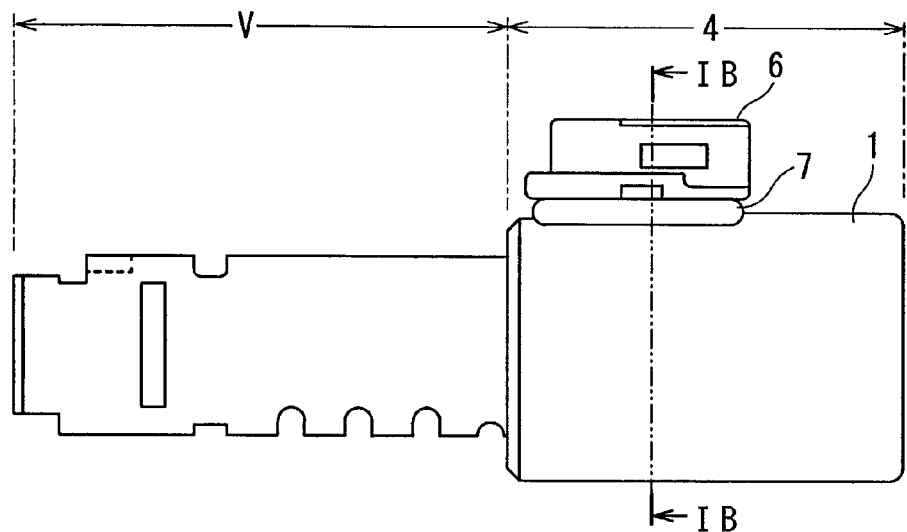
FIG. 1A is a side view illustrating a solenoid valve to which a rubber packing is attached, in accordance with a first embodiment.

In the following description, for convenience of explanation, a movement direction of a plunger is referred to as a right-left direction (axial direction). A cup-bottom side of a yoke in the right-left direction is referred to as a right side, and a cup-opening side of the yoke in the right-left direction is referred to as a left side (see, for example, FIGS. 2A and 2B). Nevertheless, the right-left direction is only for explanation, and does not limit the actual installation direction.

Embodiments will be described below with reference to the accompanying drawings. A solenoid valve includes a linear solenoid 4 having a yoke 1 with a bottom having a generally cylindrical cup shape and made of a magnetic material, a coil 2 accommodated in this yoke 1 and configured to generate magnetic force upon energization thereof, and a plunger 3 displaceable in a linear direction by this magnetic force generated by the coil 2.

A volume changing chamber α, whose volume is changed in accordance with the displacement of the plunger 3, is formed between the plunger 3 and the bottom part of the yoke 1. A breathing passage 5, which communicates between the volume changing chamber α and outside of the yoke 1, is formed in the linear solenoid 4. The linear solenoid 4 includes a resin outer connector 6, which is exposed to the outside from a notch part 1a formed at an opening of the yoke 1. An outer opening 5a of the breathing passage 5 is located at a fitted part β between the outer connector 6 and the yoke 1 (bottom part of the outer connector 6, base part of the connector 6). A rubber packing 7 having a ring shape is attached around the bottom part of the outer connector 6. The outer opening 5a is sealed with the rubber packing 7, with a minute clearance (clearance for breathing) left.

Specific examples (embodiments) will be described below in reference to the accompanying drawings. The following embodiments describe the specific examples, and the present disclosure is obviously not limited to the embodiments.

First Embodiment

A first embodiment will be described below in reference to FIGS. 1A to 3. The solenoid valve illustrated in this embodiment is disposed in a hydraulic control system of an automatic transmission for a vehicle. The solenoid valve is a combination of a valve V (although a spool valve is illustrated in FIG. 1A, a ball valve may be employed) that performs switching control of an oil passage or oil pressure control, and the linear solenoid 4 which drives this valve V.

In the hydraulic control system, the valve V is inserted and disposed in an oil circuit housing (oil passage case) having many oil passages therein. The valve V includes a valve body 10, which is inserted directly into the oil circuit housing, a valving element which is displaced inside this valve body 10, and a return spring which urges this valving element to the side on which the linear solenoid 4 is arranged (i.e., right side).

Figure 6A:
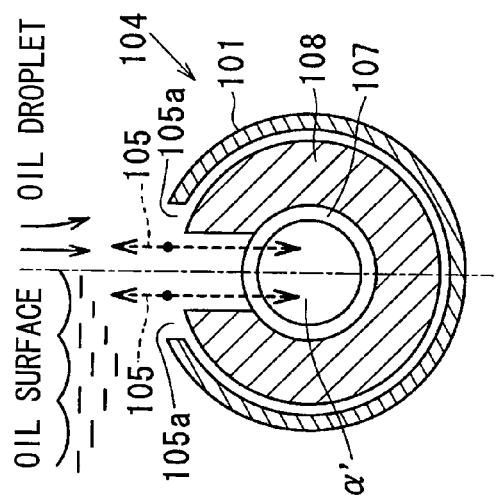
FIG. 6A is a diagram illustrating a route of entry of a foreign substance in accordance with a conventional technology.
Figure 6B:
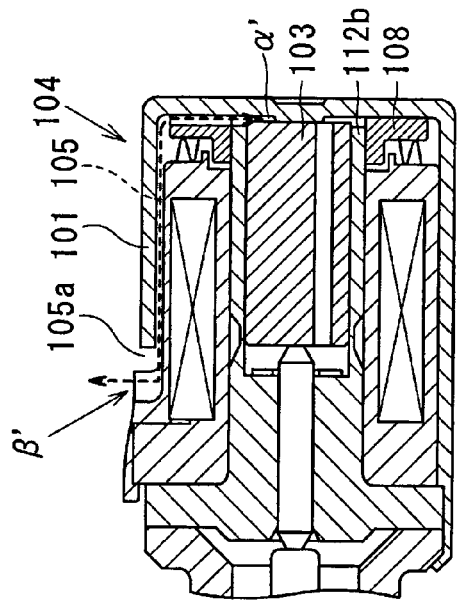
FIG. 6B is a diagram illustrating a route of entry of a foreign substance in accordance with a conventional technology.

The linear solenoid 4 drives the valving element to the side on which the return spring is arranged (i.e., left side) against urging force of the return spring. The linear solenoid 4 includes the yoke 1 with a bottom having a generally cylindrical cup shape and made of a magnetic material; the coil 2 which generates magnetic force upon energization thereof; the plunger 3 (corresponding to the numeral 103 in FIG. 6A) displaceable in a linear direction by this magnetic force generated by the coil 2; a coil molding resin 11 in which this coil 2 is molded and which is accommodated in the yoke 1, part of the resin 11 serving as the outer connector 6 outside the yoke 1; a stator core 12 that includes a magnetic attraction core 12a which magnetically attracts the plunger 3 to the left side by the magnetic force generated by the coil 2, a sliding core 12b having a cylindrical shape which covers the circumference of the plunger 3 and which directly slides the plunger 3, the core 12b delivering and receiving magnetism in the radial direction to and from the plunger 3, and a magnetic cut-off section 12c (thin wall part) which breaks the magnetism between the magnetic attraction core 12a and the sliding core 12b, the magnetic attraction core 12a, the sliding core 12b, the magnetic cut-off section 12c being integrally formed, the core 12 being made of a magnetic material; a ring core 13 made of a magnetic material which delivers and receives the magnetism between the sliding core 12b (corresponding to a stator component) and the cup bottom part of the yoke 1; and an urging ring 14 which presses this sliding core 12b toward the cup bottom part of the yoke 1.

The yoke 1 is magnetic metal (ferromagnetic material such as iron) covering the circumference of the coil 2 to apply a magnetic flux. By incorporating components of the linear solenoid 4 (the coil molding resin 11, the stator core 12, the ring core 13 and the urging ring 14 and so forth) into the yoke 1, and then by caulking a pawl part formed at a left end part of the yoke 1 on the valve body 10, the valve V and the linear solenoid 4 are firmly coupled together.

The coil 2 generates magnetic force upon energization thereof to form a magnetic flux loop passing through the yoke 1, the magnetic attraction core 12a, the sliding core 12b, and the plunger 3. The coil 2 is obtained by winding many turns a conductive wire (such as an enameled wire), to which an insulating coating is applied, around a resin bobbin 2a (primary molding resin).

The plunger 3 is magnetic metal (ferromagnetic material such as iron) having a generally cylindrical shape, and slides directly on an inner peripheral surface of the sliding core 12b as described above. The urging force of the return spring disposed in the valve V is transmitted to this plunger 3 through the valving element or a shaft. Accordingly, the plunger 3 is urged to the right side by the return spring together with the valving element. A breathing hole or breathing groove, which passes through the plunger 3 in the axial direction, is formed in the plunger 3.

The coil molding resin 11 is a secondary molding resin which is formed into the outer connector 6, and the coil 2 is molded in the resin 11 and the bobbin 2a. The outer connector 6 is disposed to project from the notch part 1a formed on an open end side of the yoke 1 and having a generally horseshoe shape toward the outside of the yoke 1. A connecting means for electrically connecting with an electronic control unit (automatic transmission electronic control unit: AT-ECU, not shown) that controls the solenoid valve, and connector terminals 6a, which are connected respectively to both ends of the coil 2, are arranged inside the outer connector 6.

The coil molding resin 11 is formed into a generally cylindrical shape in the following manner. That is, the bobbin 2a, around which the coil 2 has been wound and to which the connector terminals 6a have been attached (including the electric connection with the coil ends), is set in a resin forming die (die for determining the shape of the coil molding resin 11). Then, by pouring resin (such as poly phenylene sulfide: PPS, polybutylene terephthalate: PBT, or nylon resin) into this resin forming die, the resin 11 is formed into the generally cylindrical shape. A cylindrical part of the stator core 12 is inserted and disposed into a generally cylindrical inner peripheral surface of the resin 11. A generally cylindrical outer peripheral surface (portion except the outer connector 6) of the resin 11 is inserted and disposed in the bobbin 2a.

The ring core 13 is magnetic metal (ferromagnetic material such as iron) having a generally disc shape. A cylindrical surface for increasing a contact area of the core 13 with the sliding core 12b is provided on an inner peripheral surface of the core 13. A circular plate surface, which is in contact with the cup bottom part of the yoke 1, is provided on a right-side surface of the core 13.

The urging ring 14 is a resilient or elastic body (spring material or rubber material) that is compressed between the bobbin 2a (or the coil molding resin 11) and the ring core 13 and that is resiliently or elastically deformable at least in the axial direction. Specifically, the urging ring 14 is a metal ring resilient body such as a wave washer, or plate spring; or a ring elastic body made of rubber such as an O-ring or ring disk rubber.

The volume changing chamber α, whose volume is changed in accordance with the displacement of the plunger 3, is formed between the plunger 3 and the bottom part of the yoke 1. To displace the plunger 3 in the right-left direction by the magnetic force generated by the coil 2 and the urging force of the return spring, the volume of the volume changing chamber a needs to be changeable. Accordingly, the linear solenoid 4 of this embodiment is provided with the breathing passage 5, which communicates between the volume changing chamber α and outside of the yoke 1.

This breathing passage 5 communicates between the outer opening 5a which opens into the outside of the yoke 1 and an inner opening 5b which opens into the volume changing chamber α. The passage 5 is defined between an inner peripheral surface of the yoke 1 and an outer peripheral surface of the coil molding resin 11, between an inner peripheral surface of the yoke 1 and an outer peripheral surface of the urging ring 14, and between the yoke 1 and the ring core 13.

The outer opening 5a is located at the fitted part β between the outer connector 6 and the yoke 1 (bottom part of the outer connector 6, base part of the connector 6). On the other hand, the inner opening 5b is located between the cup bottom part of the yoke 1 and the ring core 13. A projection 1b, which projects inward of the yoke 1, is formed at the central portion of the cup bottom part of the yoke 1. Even with the plunger 3 pressed on the cup bottom part of the yoke 1, a clearance is formed between the plunger 3 and the cup bottom part of the yoke 1.

An end (right end) of the sliding core 12b is configured such that a clearance is formed between the right end of the core 12b and the cup bottom part of the yoke 1. If the ring core 13, which is in contact with the cup bottom part, is provided, the breathing passage 5 is blocked by the ring core 13. Consequently, in this embodiment, a breathing groove, which communicates between an outer circumferential side and inner circumferential side of the core 13, is formed on a right-side surface of the ring core 13 (surface in contact with the cup bottom part). This breathing groove is used as the inner opening 5b. In this embodiment, although it is illustrated that the inner opening 5b is formed at the ring core 13, an inner opening 5b (breathing groove) which communicates between the inside and outside of the ring core 13 may be provided at the cup bottom part of the yoke 1.

Figure 1B:
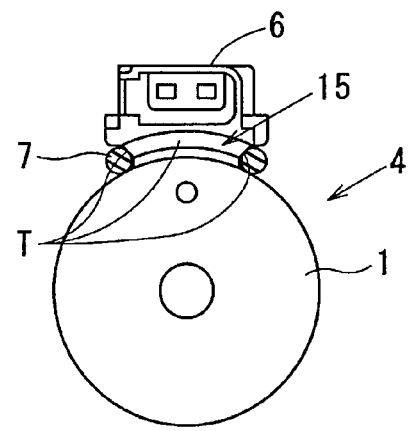
FIG. 1B is a cross-sectional view taken along a line IB-IB in FIG. 1A illustrating the rubber packing when the solenoid valve is viewed from a cup bottom according to the first embodiment.
Figure 1C:
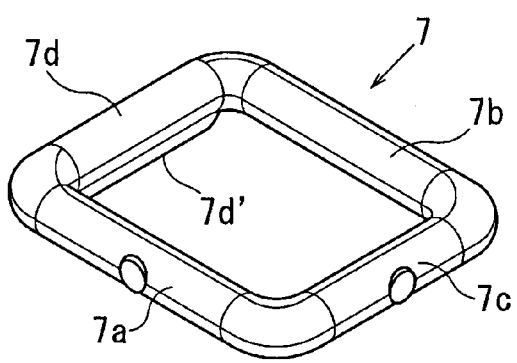
FIG. 1C is a perspective view illustrating the rubber packing of the first embodiment.

As illustrated in FIGS. 1A and 1B, the solenoid valve of this embodiment is disposed in a vehicle with the outer connector 6 arranged on the upper side of the yoke 1. In other words, the solenoid valve is disposed in a vehicle with the outer connector 6 arranged on the upper side in the vertical direction. Accordingly, when the solenoid valve is disposed in the air, a foreign substance contained in oil falling from above can easily enter into the breathing passage 5 through the outer opening 5a. In addition, when the solenoid valve is arranged in oil, a foreign substance slowly falling in oil can easily enter into the breathing passage 5 through the outer opening 5a.

For these reasons, in this embodiment, the rubber packing 7 having a ring shape is attached around the bottom part (base part) of the outer connector 6 such that the outer opening 5a is sealed with the rubber packing 7. The rubber packing 7 is not for completely sealing the outer opening 5a, and the outer opening 5a is sealed with the packing 7 with a minute clearance (clearance for breathing) left.

The outer connector 6 has a generally rectangular shape when viewed from above. An attachment groove 15, into which the rubber packing 7 is fitted, is formed around the bottom part of the outer connector 6. Just as in the case of the outer connector 6 viewed from above, this attachment groove 15 is a groove having a generally rectangular shape. The attachment groove 15 includes two axial side grooves 15a, 15b arranged along the axial direction, a right side groove 15c on the right side (side closer to the cup bottom part), and a left side groove 15d on the left side (side near the cup open end).

A tapered surface T that narrows a groove width toward a groove bottom (center side of the attachment groove 15) is formed on a groove wall surface of the outer connector 6 (upper surface of the groove) which is a part of the attachment groove 15, for increasing a degree of close attachment of the rubber packing 7. The tapered surfaces T are formed on the outer connector 6 (upper surface of the groove) for all of the two axial side grooves 15a, 15b, the right side groove 15c, and the left side groove 15d.

The rubber packing 7 is formed from a rubber material excellent in, for example, oil resistance or heat resistance. The rubber packing 7 has a rectangular shape in a state of its free length (unloaded condition) to be in conformity to the attachment groove 15 (see FIG. 1C). Specifically, the rubber packing 7 has a rectangular shape including two axial side rubbers 7a, 7b fitted into the axial side grooves 15a, 15b, a right side rubber 7c fitted into the right side groove 15c, and a left side rubber 7d fitted into the left side groove 15d.

As illustrated in FIG. 2A, the right side groove 15c of the attachment groove 15 is formed immediately below an opening of the outer connector 6 (opening into which a male connector serving as its connection counterpart enters). The right side rubber 7c of the rubber packing 7 having a rectangular shape is located between the upper surface of the yoke 1, and the lower surface of the outer connector 6.

Although a cross-sectional shape of the rubber packing 7 is not limited, except for a part of the left side rubber 7d (portion fitted in the notch part 1a), the cross-section of the rubber packing 7 of this embodiment is formed in a circular shape. The left side rubber 7d (one side part of the rubber packing 7 on the cup-opening side) is provided with a projecting portion 7d' fitted to an aperture width L of the notch part 1a.

Length of this projecting portion 7d' (length along a longitudinal direction of the left side rubber 7d) is set to accord with the aperture width L of the notch part 1a. A projection length of the projecting portion 7d' (length downward of the other rubber cross-sections) is set at such a length that a thickness difference between the size of the outer diameter of the yoke 1, and the size of an outer diameter of the portion caulked by the thin-walled pawl of the yoke 1 (outer diameter sizes of a flanged portion of a valve housing and a flanged portion of the stator core) can be compensated with the projecting portion 7d'.

A first effect of the first embodiment will be described. In the solenoid valve of this embodiment, as described above, the rubber packing 7 having a ring shape is attached around the bottom part of the outer connector 6, and the outer opening 5a is thereby sealed with the rubber packing 7. The rubber packing 7 is not for completely sealing the outer opening 5a. For example, since a minute clearance is formed at an end portion of the aperture width L of the notch part 1a, the outer opening 5a communicates with the outside of the valve through this minute clearance. In this manner, because the fitted part between the yoke 1 and the outer connector 6 (outer opening 5a of the breathing passage 5) is sealed with the rubber packing 7, a foreign substance does not enter into the breathing passage 5 regardless of an arrangement direction of the outer connector 6 (i.e., as in this embodiment, even when the outer connector 6 is arranged upward). As a result, a defect in operation of the solenoid valve can be prevented, and reliability of the valve can thereby be improved.

Moreover, the present embodiment can be realized only through the attachment of the rubber packing 7 to the existing solenoid valve. Thus, only through the attachment of the rubber packing 7 to the existing solenoid valve, a foreign substance can be prevented from entering the breathing passage 5 despite the upward attachment of the outer connector 6.

A second effect of the first embodiment will be described. In this embodiment, as described above, the tapered surface T is provided on the outer connector 6-side of the attachment groove 15 (upper surface of the groove). Owing to this tapered surface T, the rubber packing 7 is pressed strongly by members that are in contact with the rubber packing 7 (such as the outer connector 6 and the yoke 1) due to diameter reduction force (restitution force) of the rubber packing 7. Consequently, the sealing properties of the rubber packing 7 can be improved.

A third effect of the first embodiment will be described. In this embodiment, as described above, the rubber packing 7 is formed in a rectangular shape along the attachment groove 15. Accordingly, the shape of the rubber packing 7 conforms with the shape of the bottom part of the outer connector 6 (specifically, the attachment groove 15 having a rectangular shape). Consequently, the sealing properties of the rubber packing 7 can be improved.

A fourth effect of the first embodiment will be described. In this embodiment, as described above, the right side rubber 7c of the rubber packing 7 having a rectangular shape is located between the upper surface of the yoke 1, and the lower surface of the outer connector 6. As a consequence, external force applied to the outer connector 6 can be absorbed by the rubber packing 7, so that a withstand load of the outer connector 6 against the external force can be increased. Thus, the reliability of the outer connector 6 can be improved.

A fifth effect of the first embodiment will be described. In this embodiment, as described above, the projecting portion 7d', which is fitted in the aperture width L of the notch part 1a, is provided for the left side rubber 7d of the rubber packing 7 having a rectangular shape. A left-side opening part of the notch part 1a can be covered by this projecting portion 7d', so that sealing properties of the left-side opening part of the notch part 1a can be improved. Furthermore, as a result of the fitting of the projecting portion 7d' to the left-side opening part of the notch part 1a, the projecting portion 7d' functions as a means for positioning the outer connector 6. Accordingly, without a defect of misaligned attachment of the rubber packing 7 relative to the outer connector 6 (specifically, the attachment groove 15 having a rectangular shape), the reliability of the rubber packing 7 is improved, and high sealing properties can be stably achieved.

Second Embodiment

Figure 4B:
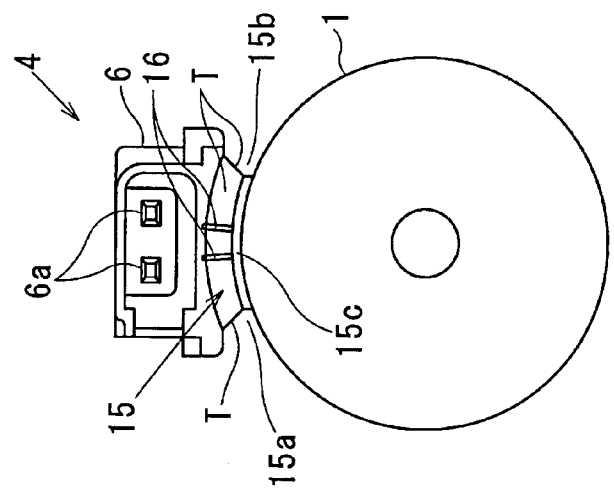
FIG. 4B is a diagram illustrating the solenoid valve, to which the rubber packing is not attached, when the solenoid valve is viewed from a cup bottom according to the second embodiment.
Figure 4A:
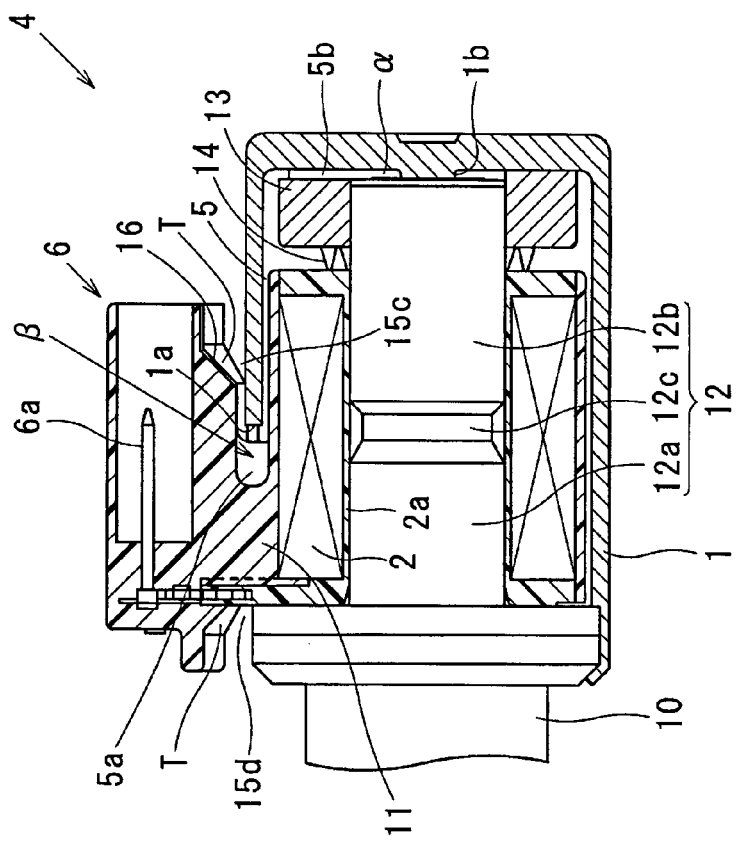
FIG. 4A is a sectional view illustrating a main feature of a linear solenoid in a solenoid valve, to which a rubber packing is not attached, in accordance with a second embodiment.
Figure 5:
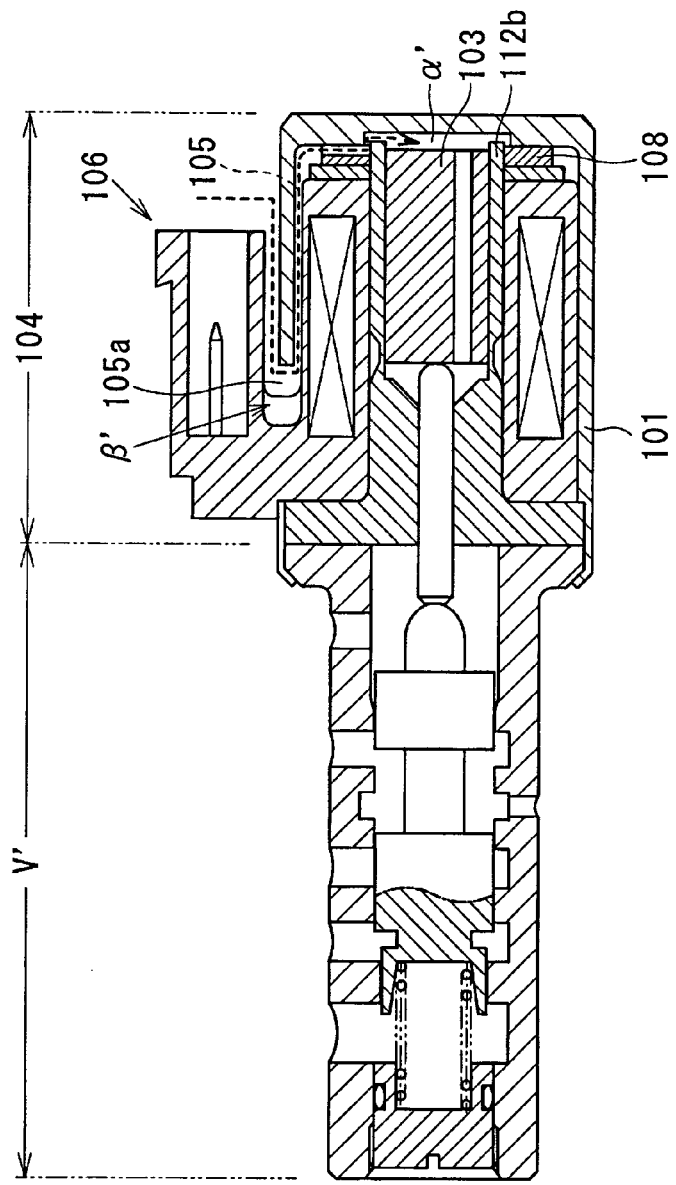
FIG. 5 is a sectional view illustrating a previously proposed solenoid valve.

A second embodiment will be described with reference to FIGS. 4A and 4B. In the second embodiment, the same numeral as in the above first embodiment indicates its corresponding functional component. In the above first embodiment, it is illustrated that the outer opening 5a communicates with the outside of the solenoid 4 by means of a minute clearance that the rubber packing 7 cannot close. To further improve the sealing performance of the rubber packing 7, the rubber packing 7 may completely block the outer opening 5a. Or, by the breathing through the minute clearance, a delayed response of the linear solenoid 4 may be assumed.

Consequently, in this second embodiment, a breathing groove 16, which communicates between the inside and outside of a rubber packing 7, is provided for an outer connector 6. If the breathing groove 16 is simply added to the outer connector 6, there is concern that a foreign substance may enter into a breathing passage 5 through the newly-provided breathing groove 16. Accordingly, in this embodiment, as illustrated in FIG. 4B, when the outer connector 6 is disposed on the upper side of a yoke 1, and when the yoke 1 is viewed from its cup-bottom side, (example of "the yoke 1 being viewed from its axial direction"), the breathing groove 16 is formed on a lower surface of the outer connector 6 as well as at a generally central part of a right-left width of the outer connector 6 (example of the "intermediate part"). While it is illustrated in FIGS. 4A and 4B that the two breathing grooves 16 are formed, the number of the breathing grooves 16 is not limited. For example, the number of the grooves 16 may be increased with a passage cross section of the breathing groove 16 made smaller, or conversely, only a single groove 16 may be formed. As well, it is illustrated in FIGS. 4A and 4B that the breathing groove 16 is provided on a right-side lower surface of the outer connector 6. Alternatively, the groove 16 may be provided on a left-side lower surface of the outer connector 6.

By providing such a breathing groove 16 for the outer connector 6, an outer opening 5a can communicate reliably with the outside of a solenoid 4. Accordingly, breathing operation of the breathing passage 5 can stably be carried out, and the reliability of a solenoid valve can thereby be improved. Moreover, despite the upward attachment of the outer connector 6, the entry of a foreign substance into the breathing groove 16 due to gravity can be prevented because the outer connector 6 serves as an "umbrella" against a fall of the foreign substance. In this manner, since a foreign substance does not enter into the breathing passage 5, a defect in operation of the solenoid valve can be prevented, and reliability of the valve can thereby be improved. Industrial applicability of the solenoid valve will be described.

In the above embodiments, the example of use of the rubber packing 7 having a generally rectangular shape is shown. Alternatively, a rubber packing 7 (O-ring) having a circular ring shape may be attached to the bottom part of the outer connector 6.

In the above embodiments, it is illustrated that the present disclosure is applied to the solenoid valve used for the hydraulic control system of the automatic transmission for a vehicle. Nevertheless, the present disclosure may be applied to other solenoid valves than the automatic transmission.

To sum up, the solenoid valve of the above embodiments can be described as follows.

A solenoid valve includes a linear solenoid 4 and a ring-shaped rubber packing 7. The linear solenoid 4 includes a yoke 1, an outer connector 6, a volume changing chamber α, and a breathing passage 5. The yoke 1 is formed in a generally cylindrical cup shape having a cup-bottom part and a cup-opening part, and the yoke 1 is made of a magnetic material. The cup-opening part includes a notch part 1a. The outer connector 6 is made of resin and exposed from the notch part 1a to an outside of the yoke 1. Volume of the volume changing chamber α is changed in accordance with operation of the linear solenoid 4. The breathing passage 5 is formed inside the linear solenoid 4, and the breathing passage 5 communicates with the volume changing chamber α. The breathing passage 5 includes an outer opening 5a, which opens into the outside of the yoke 1 and is located at a fitted part 13 between the yoke 1 and the outer connector 6. The ring-shaped rubber packing 7 is attached around a base part of the outer connector 6, where the yoke 1 and the outer connector 6 are fitted together. Accordingly, the outer opening 5a of the breathing passage 5, which is located at the fitted part β between the yoke 1 and the outer connector 6, is sealed with the rubber packing 7. Strictly speaking, it is difficult to completely seal the entire left-side opening part of the notch part 1a of the yoke 1 with the rubber packing 7 (particularly, it is difficult to perfectly close both ends of the left-side opening part of the notch part 1a) and thus a slight clearance is formed. The breathing passage 5 communicates with the outside using this slight clearance. Or, in the case of the outer opening 5a being perfectly closed by the rubber packing 7, the breathing groove 16, which communicates between the inside and outside of a rubber packing 7, is intentionally formed on a part of the outer connector 6. The breathing groove 16 is provided such that the breathing passage 5 communicates with the outside. In this manner, because the fitted part β between the yoke 1 and the outer connector 6 (outer opening 5a of the breathing passage 5) is sealed with the rubber packing 7, a foreign substance does not enter into the breathing passage 5 regardless of an arrangement direction of the outer connector 6 (i.e., even when the outer connector 6 is arranged upward). As a result, a defect in operation of the solenoid valve can be prevented, and reliability of the valve can thereby be improved.

The outer connector 6 may include an attachment groove 15 around the base part of the outer connector 6. The rubber packing 7 is fitted in the attachment groove 15. A wall surface of the attachment groove 15 on the outer connector 6-side may include a tapered surface T that narrows a width of the attachment groove 15 toward a bottom of the attachment groove 15. As a result of the tapered surface T in this manner, the rubber packing 7 is pressed strongly by members that are in contact with the rubber packing 7 (such as the outer connector 6 and the yoke 1) due to diameter reduction force (restitution force) of the rubber packing 7. Consequently, the sealing properties of the rubber packing 7 can be improved.

The rubber packing 7 may have a rectangular shape. As a result of the conformity of the shape of the rubber packing 7 to the shape of the bottom part of the outer connector 6, the sealing properties of the rubber packing 7 can be improved.

A first side 7c of the rectangular rubber packing 7, which is located on the cup-bottom part-side of the yoke 1, may be disposed between the yoke 1 and the outer connector 6. As a consequence, external force applied to the outer connector 6 can be absorbed by the rubber packing 7, so that a withstand load of the outer connector 6 against the external force can be increased. Thus, the reliability of the outer connector 6 can be improved.

A second side 7d of the rectangular rubber packing 7, which is located on the cup-opening part-side of the yoke 1, may include a projecting portion 7d' that is fitted in an opening of the notch part 1a. A left-side opening part of the notch part 1a can be covered by this projecting portion 7d', so that sealing properties of the left-side opening part of the notch part 1a can be improved. Furthermore, as a result of the fitting of the projecting portion 7d' to the left-side opening part of the notch part 1a, the projecting portion 7d' functions as a means for positioning the outer connector 6. Accordingly, without a defect of misaligned attachment of the rubber packing 7 relative to the outer connector 6, the reliability of the rubber packing 7 is improved, and high sealing properties can be stably achieved.

The outer connector 6 may include a breathing groove 16 that communicates between an inside and outside of the rubber packing 7. When the outer connector 6 is disposed on an upper side of the yoke 1 in a vertical direction of the linear solenoid 4 and the yoke 1 is viewed from its axial direction, the breathing groove 16 may be formed on a lower surface of the outer connector 6 in the vertical direction as well as at an intermediate part of the outer connector 6 in a direction perpendicular to the vertical direction. Accordingly, even in the case of complete blockage of the outer opening 5a with the rubber packing 7, the breathing passage 5 can communicate with the outside through the breathing groove 16. When the outer connector 6 is disposed on the upper side of the yoke 1 and the yoke 1 is viewed from the axial direction, by forming the breathing groove 16 on the lower surface of the outer connector 6 as well as at the intermediate part of the outer connector 6 in its right-left width direction, despite the upward attachment of the outer connector 6, the entry of a foreign substance into the breathing groove 16 can be prevented because the outer connector 6 serves as an "umbrella". In this manner, since a foreign substance does not enter into the breathing passage 5, a defect in operation of the solenoid valve can be prevented, and reliability of the valve can thereby be improved.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:
1. A solenoid valve comprising:
   a linear solenoid that includes:
      a yoke which is formed in a generally cylindrical cup shape having a cup-bottom part and a cup-opening part and which is made of a magnetic material, wherein the cup-opening part includes a notch part;
      an outer connector made of resin and exposed from the notch part to an outside of the yoke;
      a volume changing chamber, volume of which is changed in accordance with operation of the linear solenoid; and
      a breathing passage formed inside the linear solenoid and communicating with the volume changing chamber, wherein the breathing passage includes an outer opening, which opens into the outside of the yoke and is located at a fitted part between the yoke and the outer connector; and
   a ring-shaped rubber packing that is attached around a base part of the outer connector, where the yoke and the outer connector are fitted together,
   wherein the rubber packing has a rectangular shape, and
   a second side of the rectangular rubber packing, which is located on the cup-opening part-side of the yoke, includes a projecting portion that is fitted in an opening of the notch part.
2. The solenoid valve according to claim 1, wherein:
   the outer connector includes an attachment groove around the base part of the outer connector;
   the rubber packing is fitted in the attachment groove; and a wall surface of the attachment groove on the outer connector-side includes a tapered surface that narrows a width of the attachment groove toward a bottom of the attachment groove.

3. The solenoid valve according to claim 1, wherein a first side of the rectangular rubber packing, which is located on the cup-bottom part-side of the yoke, is disposed between the yoke and the outer connector.

4. The solenoid valve according to claim 1, wherein the projecting portion is fitted in the opening of the notch part such that a length of the projecting portion along a longitudinal direction of the second side accords with a width of the notch part.

5. The solenoid valve according to claim 1, wherein:
the outer connector includes a breathing groove that communicates between an inside and outside of the rubber packing; and
when the outer connector is disposed on an upper side of the yoke in a vertical direction of the linear solenoid and the yoke is viewed from its axial direction, the breathing groove is formed on a lower surface of the outer connector in the vertical direction as well as at an intermediate part of the outer connector in a direction perpendicular to the vertical direction.

* * * * *